United States Patent [19]

Weymans et al.

[11] Patent Number: 5,221,731
[45] Date of Patent: Jun. 22, 1993

[54] PROCESS FOR ISOLATING POLYCARBONATES WITH $CO_2$ UNDER PRESSURE

[75] Inventors: Günther Weymans; Jürgen Kirsch, both of Leverkusen; Wolfgang Herrig, Bergisch Gladbach; Hanns-Ingolf Paul; Rolf Treckmann, both of Cologne, all of Fed. Rep. of Germany

[73] Assignee: Bayer Aktiengesellschaft, Leverkusen, Fed. Rep. of Germany

[21] Appl. No.: 888,942

[22] Filed: May 26, 1992

[30] Foreign Application Priority Data

May 30, 1991 [DE] Fed. Rep. of Germany ....... 4117751

[51] Int. Cl.⁵ ............................................. C08G 64/40
[52] U.S. Cl. .................... 528/483; 528/196; 528/198
[58] Field of Search ................ 528/483, 196, 198

[56] References Cited

U.S. PATENT DOCUMENTS

| | | | |
|---|---|---|---|
| 4,634,761 | 1/1987 | Mendiratta et al. | 528/500 |
| 4,892,931 | 1/1990 | Knerr | 528/483 |
| 4,918,160 | 4/1990 | Kondoh et al. | 528/483 |
| 5,080,845 | 1/1992 | Herrmann et al. | 264/101 |

FOREIGN PATENT DOCUMENTS

334312  9/1989  European Pat. Off. .

Primary Examiner—Harold D. Anderson
Attorney, Agent, or Firm—Joseph C. Gil; Aron Preis

[57] ABSTRACT

A continuous process for the isolation of polycarbonates from a solution of polycarbonate in methylene chloride at temperatures of 30° to 80° C. is disclosed. The process which yields polycarbonate in powder form having residual solvent content of less than 5% by weight, is characterized in that it entails the following steps:

a) obtaining a solution of polycarbonate in methylene chloride containing 10 to 40 percent polycarbonate, said percent being relative to the total weight of the polycarbonate solution, b) mixing into said solution under pressures of 10 to 50 bar and at temperatures of 30° to 50° C. a fluid containing carbon dioxide resulting in a non-gelling polycarboniate/methylene/chloride/dioxide pressurized system, in which between 10 and 12% $CO_2$ are dissolved, c) mixing said pressurized system in a two-component nozzle with additional fluid containing carbon dioxide under a pressure of 50 to 300 bar and at temperatures of 40° to 150° C., to cause rapid precipitation of polycarbonate in the form of solid particles, the quantitative ratio of $CO_2$ to solution being between 1.0 and 15, preferably between 2.5 and 8.0, f) separating methylene chloride and carbon dioxide gases in a compressor/condenser system.

The process is further characterized in that a time interval of at least 0.1 second separates step b) and step c), and in that the input of the fluid containing carbon dioxide is controlled to prevent gelatin in step b) and in that the pressurized system is above the gelation range in step c).

3 Claims, No Drawings ically at least 80% by weight.

PROCESS FOR ISOLATING POLYCARBONATES WITH CO₂ UNDER PRESSURE

FIELD OF THE INVENTION

The invention concerns polycarbonate resins and in particular their manufacture.

SUMMARY OF THE INVENTION

A continuous process for the isolation of polycarbonates from a solution of polycarbonate in methylene chloride at temperatures of 30° to 80° C. is disclosed. The process which yields polycarbonate in powder form having residual solvent content of less than 5% by weight, is characterized in that it entails the following steps:
 a) obtaining a solution of polycarbonate in methylene chloride containing 10 to 40 percent polycarbonate, said percent being relative to the total weight of the polycarbonate solution,
 b) mixing into said solution under pressures of 10 to 50 bar and at temperatures of 30° to 50° C. a fluid containing carbon dioxide resulting in a non-gelling polycarbonate/methylene chloride/carbon dioxide pressurized system in which between 10 and 12% $CO_2$ are dissolved,
 c) mixing said pressurized system in a two-component nozzle with additional fluid containing carbon dioxide under a pressure of 50 to 300 bar and at temperatures of 40° to 150° C., to cause rapid precipitation of polycarbonate in the form of solid particles, the quantitative ratio of $CO_2$ to solution being between 1.0 and 15, preferably between 2.5 and 8.0,
 f) separating methylene chloride and carbon dioxide gases in a compressor/condenser system.

The process is further characterized in that a time interval of at least 0.1 second separates step b) and step c), and in that the input of the fluid containing carbon dioxide is controlled to prevent gelation in step b) and in that the pressurized system is above the gelation range in step c).

BACKGROUND OF THE INVENTION

German patent application P 40 40 855.8 (Le A 27 877) describes a process for isolating polymers from their solvents by addition of fluids containing carbon dioxide at temperatures of 30° C. to 280° C. and under pressures of 1 bar to 1,000 bar, characterized in that the concentration of the polymers in their solvents is between 5% by weight and 80% by weight and in that the fluid containing carbon dioxide consists of at least 50% by weight carbon dioxide.

Compared with other processes for isolating polymers from their solvents, as described for example in U.S. Pat. No. 4,634,761, EP 334 314 A2, DE 3 840 293 A1, JP 01 16 8730-A2 and the publication "Yamamoto Koji" et al.: Kagaku Kogaku Ronbunshu 15 (3), Vol. 1989, pages 673-675, the process described in the German patent application has the advantage that large quantities of solvent are removed quickly and easily without significant exposure of the product to heat.

It has now been found that the isolation process described in German patent application P 40 40 855.8 (Le A 27 877) can be improved in regard to the production of polycarbonate in powder form.

DETAILED DESCRIPTION OF THE INVENTION

Accordingly, the present invention relates to a continuous process for isolating polycarbonates from methylene chloride at temperatures of 30° to 80° C., resulting in a polycarbonate product in the form of powder having residual solvent contents of less than 5% by weight. The process is characterized in that
 a) starting out from a solution of polycarbonate in methylene chloride which contains 10 to 40% by weight polycarbonate, based on the total weight of the polycarbonate solution,
 b) fluid containing carbon dioxide is first mixed in typically under pressures of 10 to 50 bar and at temperatures of 30° to 50° C., so that the resulting pressurized polycarbonate/methylene chloride/carbon dioxide system does not gel and contains 10 to 12% $CO_2$ dissolved therein,
 c) the pressurized solution containing polycarbonate, methylene chloride and fluid containing carbon dioxide is mixed in a two-component nozzle with more of the fluid containing carbon dioxide under a pressure of 50 to 300 bar, preferably 70 to 200 bar at temperatures of 40° to 150° C., preferably 80° to 120° C., to form a three-phase system in which the quantitative ratio of $CO_2$ to solution is finally between 1.0 and 15, and preferably between 2.5 and 8.0,
 d) a holding time of at least 0.1 second being established between step b) and step c) and
 e) the input of the fluid containing carbon dioxide generally being controlled via the thermal conditions so that polycarbonate does not gel in step b) and the polycarbonate/methylene chloride/carbon dioxide system is above the gelation range in step c) due to the adequate degree of super-saturation and polycarbonate rapidly precipitates from the three-phase system in the form of solid particles, the control being effected by the thermal conditions, namely pressure and temperature, and by the residence time, of which the pressure is the most crucial parameter,
 f) methylene chloride and carbon dioxide gases largely being separated in a compressor/condenser system and carbon dioxide being returned to the supercritical fluid extraction process. The polycarbonate/methylene chloride/carbon dioxide system does not gel if it is constantly kept at below the point of critical supersaturation. It does not for example gel if the temperature is >30° C., the pressure is <40 bar or the $CO_2$ content is <8% by weight. The more closely the system approaches critical supersaturation the shorter is the required residence time, such as for example a maximum of 35 minutes at 48° C. and 50 bar.

Suitable fluids containing carbon-dioxide are fluids which contain at least 20% by weight, preferably at least 50% by weight and most preferably at least 80% by weight, based on the total weight of the fluid, of pure carbon dioxide. Other gases are for example $N_2$, $CH_4$, inert gases or sulfur hexafluoride, it being possible to use $C_1$ to $C_{10}$ alcohols, ketones or n-alkanes as entraining agents. Other preferred fluids containing carbon dioxide are those which contain impurities of methylene chloride. At least 20% by weight $CO_2$ means 20· to 100% by weight $CO_2$, and the same applies in the case of at least 50% by weight and at least 80% by weight.

Suitable polycarbonates are any thermoplastic and aliphatic polycarbonates having molecular weight, solution viscosities, distributions and uniformities in known ranges. The only important requirement is that the polycarbonates to be used should be soluble in methylene chloride at the temperatures applied. Preferred polycarbonates are aromatic polycarbonates based on diphenols, for example of the type described in U.S. Pat. Nos. 3,028,365, 2,999,835, 3,148,172, 3,275,601, 2,991,273, 3,271,367, 3,096,278, 2,970,131 and 2,999,846 and in DE-OSS I 570,703, 2,063,050, 2,063,052, 2,211,095, 3,832,396 (Le A 26,344) and 3,833,953 (Le A 26,397). Particularly preferred polycarbonates are those containing at least 5 mol-%, based on the total quantity of diphenols used (=100 mol-%), of the following diphenols: 4,4'-dihydroxydiphenyl, 2,2-bis-(4-hydroxyphenyl)-propane, 2-2-bis-(3,5-dimethyl-4-hydroxyphenyl)-propane and 1,1-bis-(4-hydroxyphenyl)-3,3,5-trimethyl cyclohexane. The polycarbonates may be copolymers or homopolymers and mixtures may also be used. The copolymers may be block copolymers or statistical copolymers and may also be branched.

Polycarbonate solution in methylene chloride in parts by weight of 10 to 40% by weight are generally obtained in the production of polycarbonate by the two-phase boundary process. The polycarbonates to be isolated according to the invention are generally obtained in the abovementioned concentrations in such methylene chloride solutions.

Other components which, together with the carbon dioxide, form the fluid containing carbon dioxide may be any other components which do not damage the polycarbonate or the methylene chloride. Components which stabilize the polycarbonate against external influences (UV, weathering, etc.) may optionally be used as these other components.

Two-component nozzles are used as the mixing element. Preferred two-component nozzles are those which thoroughly mix the low-viscosity fluid containing carbon dioxide with the relatively high-viscosity methylene chloride/fluid/polycarbonate system and which offer a holding time in the nozzle under favorable mixing conditions of at least 1/30th of a second.

The preferred mixing conditions are provided by the nozzle geometry in such a manner that
1) the components are introduced tangentially into the mixing chamber of the nozzle,
2) the streams are oriented in such a manner that a ram jet mixing effect is achieved and
3) additional fittings, such as swirl plates, are provided in the nozzle chamber.

The precipitated polycarbonate is expanded together with the methylene chloride and the fluid containing carbon dioxide in an expansion vessel. The arrangement of the nozzle and the expansion vessel may preferably be selected so that the powder travels a distance equivalent to at least 1/10th of a second or for example 175 mm, before being deposited in the expansion vessel. The powder may then be further processed to granules and may even be compacted.

The fluid is returned to the process via a condenser/compressor system. The fluid may contain up to 20% by weight, based on the total weight of the fluid, of methylene chloride as impurity.

EXAMPLES

General procedure for the Examples:

700 g polycarbonate based on bisphenol A (Makrolon 2805) having a relative viscosity of 1.28, as measured for 5 g polymer in 1,000 g methylene chloride at 25° C., are dissolved in 4,300 g methylene chloride. The polymer solution is accommodated in a 50 liter autoclave at 50° C. into which carbon dioxide is introduced with intensive stirring until a predetermined pressure has been established (Presaturation according to (b)). The solution is then combined with continued introduction of carbon dioxide in a conical mixing nozzle with a swirl plate and two feed pipes for more carbon dioxide and the polymer solution (according to (c)). The rate at which the polymer solution and the carbon dioxide are fed to the nozzle is adjusted (according to (d)). The nozzle is followed by a 100 liter expansion vessel in which the precipitating polycarbonate is whirled around together with the methylene chloride and the carbon dioxide. Samples are taken and analyzed at minute intervals during the distraction process. The following process parameters are varied:

initial pressure in the storage vessel
feed rate of the polymer solution
feed rate and quantity of the carbon dioxide
pressure of the carbon dioxide at the nozzle.

The back pressure at the nozzle, the residual methylene chloride content and the morphology and apparent density of the powder are analyzed.

EXAMPLE 1

The initial pressure, i.e. the pressure in step (b), is 20 bar. Feed rate 17.6 ml/min.

Quantity of $CO_2$ in nozzle, based on the total quantity of polymer solution: 500%.

Carbon dioxide introduced under a pressure of 130 bar at a temperature of 110° C.

Result: nozzle back pressure 90 bar, residual methylene chloride content of all samples under 1%, completely amorphous powder in every case (characterized by differential scanning colorimetry), apparent density 0.10 g/cm$^3$.

EXAMPLE 2

The initial pressure, i.e. the pressure in step (b), is 30 bar. Feed rate of polymer solution: 31.4 ml/min.

Quantity of $CO_2$ nozzle: 19.5 kg/hour.

Temperature of $CO_2$ before nozzle: 105° C.

Temperature of PC solution: 25° C. before the nozzle.

The expansion vessel was preheated to 70° C. and kept at that temperature. Pressure of the $CO_2$ before the nozzle: 90 bar. Result: nozzle back pressure 85 bar, apparent density 0.07 g/cm$^3$, fine-particle amorphous powder, residual solvent content under 1%. The powder was very free-flowing and did not agglomerate or cake.

COMPARISON EXAMPLE

No initial pressure, otherwise as in Example 1. The test had to be terminated after a few minutes because the nozzle was blocked. The powder had an apparent density of 0.015 g/cc and had a low residual solvent content (<2%).

What is claimed is:

1. A continuous process for the isolation of polycarbonates from a solution of polycarbonate in methylene chloride at temperatures of 30° to 80° C. said process yielding polycarbonate in powder form having residual solvent content of less than 5% by weight, comprising steps a) producing a solution of polycarbonate in methylene chloride containing 10 to 40 percent polycarbonate, said percent being relative to the total weight of the polycarbonate solution,
b) mixing into said solution under pressures of 10 to 50 bar and at temperatures of 30° to 50° C. a fluid containing carbon dioxide resulting in a non-gelling polycarbonate/methylene chloride/carbon dioxide pressurized system, in which 10 to 12% $CO_2$ are dissolved,
c) mixing said pressurized system in a two-component nozzle with additional fluid containing carbon dioxide under a pressure of 50 to 300 bar and at temperatures of 40° to 150° C., to cause rapid precipitation of polycarbonate in the form of solid particles, the quantitative ratio of $CO_2$ to solution being between 1.0 and 15, and
f) separating methylene chloride and carbon dioxide gases in a compressor/condenser system said process being further characterized in that a time interval of at least 0.1 second separates step b) and step c), and in that the input of the fluid containing carbon dioxide is controlled to prevent gelation in step b) and in the pressurized system in step c).

2. The process of claim 1 wherein said mixing c) is under a pressure of 70 to 200 bar.

3. The process of claim 1 wherein said mixing c) is at temperatures of 80° to 120° C.

* * * * *